United States Patent [19]

Suckow

[11] 4,217,766
[45] Aug. 19, 1980

[54] SHAFT VIBRATION DAMPER

[75] Inventor: David S. Suckow, Decatur, Ill.

[73] Assignee: Caterpillar Tractor Co., Peoria, Ill.

[21] Appl. No.: 938,731

[22] Filed: Aug. 31, 1978

[51] Int. Cl.³ .............................................. F16C 3/00
[52] U.S. Cl. ..................................... 64/1 V; 74/574; 308/237 R
[58] Field of Search ............... 64/1 V, 1 R, 1 S, 3, 64/4; 74/574; 308/237 R

[56] References Cited

U.S. PATENT DOCUMENTS

| | | | |
|---|---|---|---|
| 1,627,936 | 5/1927 | Swenson | 64/1 V |
| 1,768,290 | 6/1930 | Newkirk | 64/1 V |
| 2,652,700 | 9/1953 | Seibel | 64/1 |
| 2,781,436 | 2/1957 | Barden | 64/1 V |
| 2,889,695 | 6/1957 | Moeller | 64/1 V |
| 2,906,572 | 9/1959 | Wroby | 308/184 |
| 3,150,900 | 9/1964 | Bruenig | 308/237 |
| 3,318,410 | 5/1967 | Johnson | 180/70 |
| 3,887,024 | 5/1975 | Takahashi | 180/70 P |
| 3,897,984 | 8/1975 | Matheny | 308/62 |
| 3,938,354 | 2/1976 | Lehman | 64/1 V |
| 4,061,279 | 12/1977 | Sautter | 64/1 V |
| 4,085,627 | 4/1978 | Losee | 74/574 |
| 4,134,309 | 1/1979 | Balke et al. | 64/1 V |

FOREIGN PATENT DOCUMENTS

| | | | |
|---|---|---|---|
| 805461 | 8/1936 | France | 64/1 V |
| 1295476 | 5/1962 | France | 64/1 V |
| 726791 | 3/1955 | United Kingdom | 64/1 V |
| 1093432 | 12/1967 | United Kingdom | 64/1 A |

Primary Examiner—Ira S. Lazarus
Attorney, Agent, or Firm—Wegner, Stellman, McCord, Wiles & Wood

[57] ABSTRACT

An apparatus (120) for intermittent support of a rotatable shaft (22) comprises an axial collar (120) substantially coaxial with the shaft (22) and fixed thereabout for rubbing contact with the shaft (22) only after the shaft deflects a predetermined amount from its rotational axis (140) to alter the bending mode of the shaft (22) thereby increasing the first order critical speed of the shaft (22) to a level above the maximum speed at which the shaft (22) may be driven to prevent excessive vibration and consequent damage to the shaft (22), associated end couplings (35,56) and housing (78,84,92).

8 Claims, 3 Drawing Figures

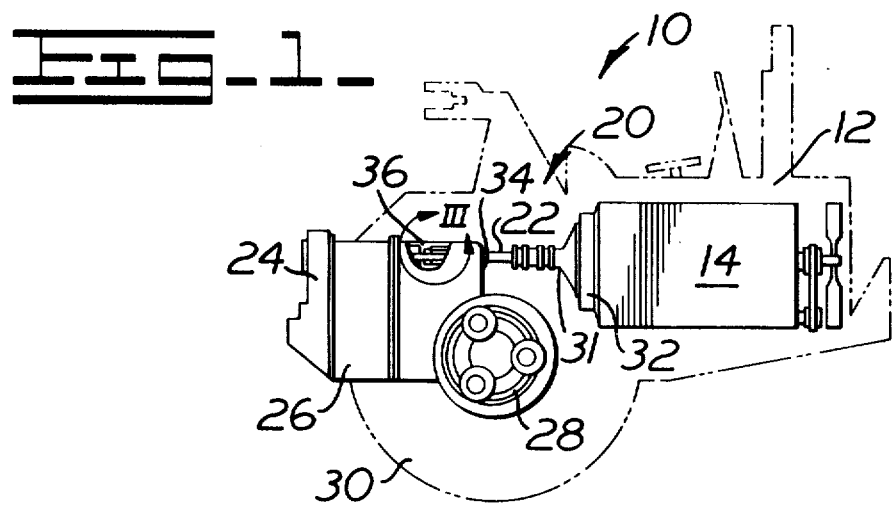
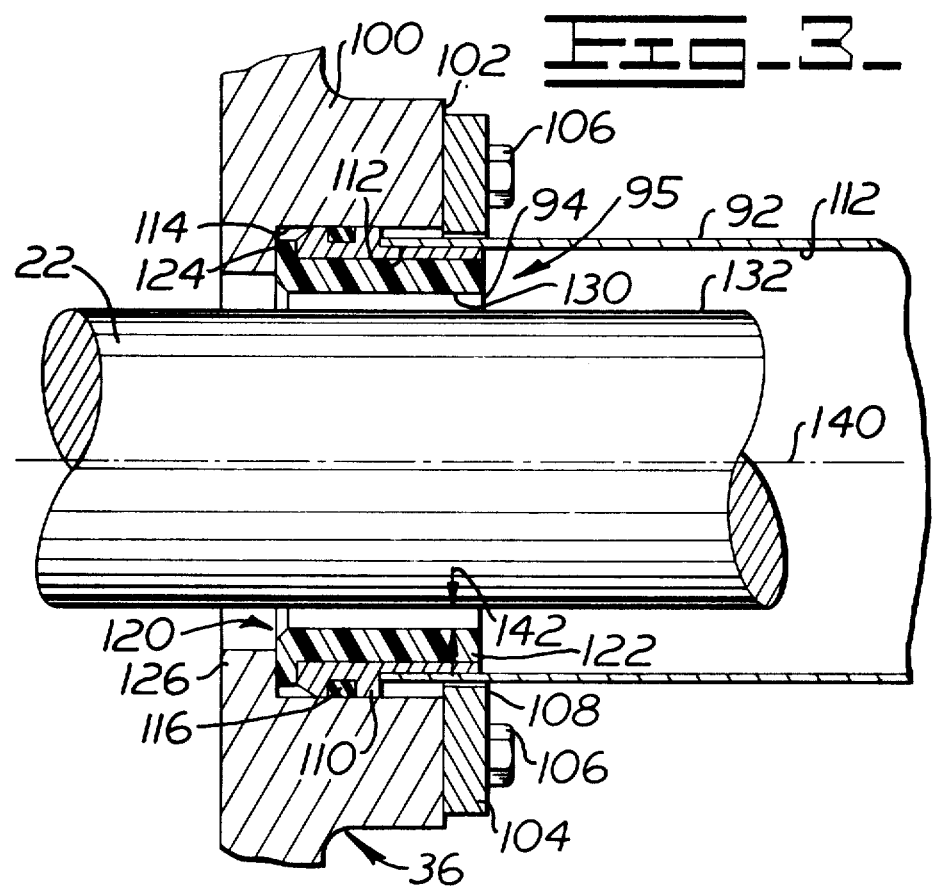

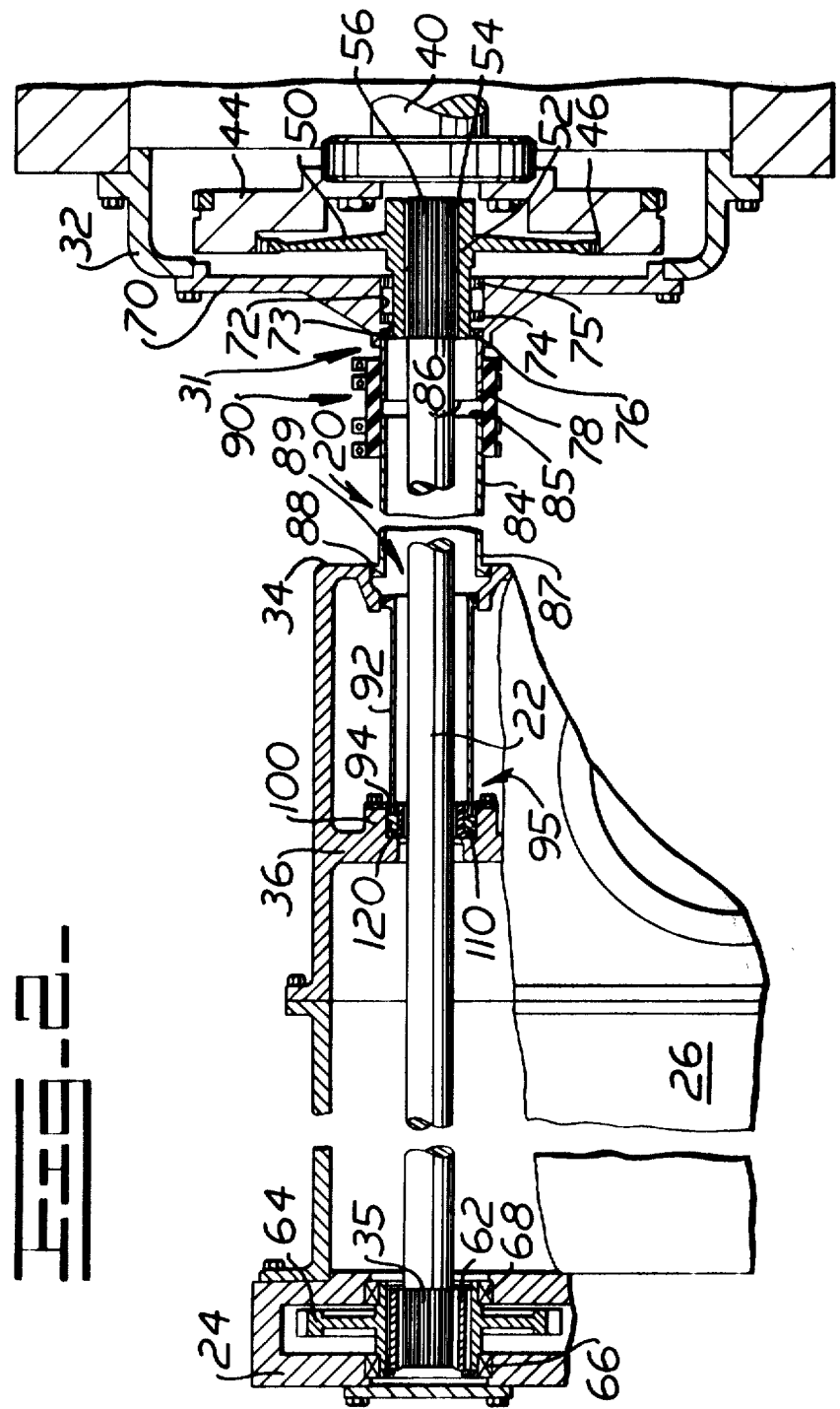

SHAFT VIBRATION DAMPER

TECHNICAL FIELD

This invention relates to apparatus for eliminating excessive vibration in rotating shafts and, more specifically, this invention relates to drive shaft oscillation dampers.

BACKGROUND ART

It is well known that, as the rotational velocity of a shaft increases, the shaft passes through several progressively higher speed ranges known as critical speeds. If a shaft is unsupported intermediate its ends and is rotated at or near what is known as its first order critical speed, centrifugal forces periodically exceed centripetal forces at the shaft's median portion to bow the shaft outwardly from its normal rotational axis, whereupon shaft rotation becomes unstable and excessive vibration occurs. Such vibration may quickly damage bearings and bearing support structures, as well as the shaft, and may result in impact of the shaft against housing elements.

After a rotating shaft reaches a soeed greater than its first order critical speed, vibration subsides and the shaft rotates smoothly. Since the second order critical speed of any shaft is considerably greater than its first order critical speed, there is a wide range of speeds between the first and second order critical speeds at which the shaft will operate with little or no vibration and with little effect on the bearings, other than normal wear.

While a shaft may be operated safely at speeds below its first order critical speed, the preferred speed for a particular operation may be above the first critical speed. In such a case, in order to avoid undesirable shaft vibration and possible impact with the shaft housing during acceleration or deceleration through the first order critical speed, it is desirable to increase the shaft's first order critical speed to a speed above the maximum desired operational speed by altering the shaft's mode of vibration.

A shaft's first order critical speed is inversely related to its length and directly related to its rigidity which, in turn, is directly related to the shaft's diameter. Attempts to increase the first order critical speed of a shaft have, through changes in shaft design, encountered various design problems such as increased bearing size and overall weight.

Prior attempts to damp shaft vibration or to otherwise modify shaft vibration modes have had only limited success. Prior approaches to the problem are described in Matheny, Jr. U.S. Pat. No. 3,897,984, issued Aug. 5, 1975, and Seibel 2,652,700, issued Sept. 22, 1953.

Matheny, Jr. provides a shaft support comprising a generally annular resilient member disposed slightly eccentrically about the shaft generally centrally thereof. The resilient member has means associated therewith for exerting a radial preload force on the shaft. The force exerting means includes an annular roller bearing disposed about the shaft and contacting a sleeve thereon. Shaft vibration is thereby damped but at the expense of constant bearing contact and, therefore, constant wear of the shaft and the bearing structure, with consequent power losses due to friction.

In Seibel, a shaft extends through the central aperture of a damper plate which is mounted to the shaft housing by springs. The plate is contacted by a sleeve on the shaft during rotation thereof to absorb energy to prevent transmittal of shock to the supporting structure. Structures such as in Seibel tend to be noisy, involve relatively many parts, and suffer excessive wear.

DISCLOSURE OF INVENTION

The vibration damper of the present invention solves the problems described above without the disadvantages of prior vibration dampers.

In one aspect of the present invention, excessive drive shaft oscillation is eliminated by the provision of an annular collar fixed about the shaft with an interior surface substantially coaxial with and spaced from the shaft for intermittent rubbing engagement therewith as the shaft "bows" before the first order critical speed is reached to alter the shaft's mode of vibration to increase the shaft's first order critical speed and thereby eliminate excessive shaft oscillation, thereby greatly reducing stresses within the shaft and at its end couplings.

The collar is of a selected low friction material having sufficient pressure, velocity and temperature resistant properties to withstand stresses generated by contact with the shaft. Appropriate selection of collar material results in a substantially noiseless, long-lasting vibration damper which is easily inspected, repaired, or replaced in the field.

BRIEF DESCRIPTION OF THE DRAWINGS

FIG. 1 is a schematic, partially fragmentary view of a portion of a scraper tractor incorporating an embodiment of the present invention;

FIG. 2 is an enlarged, fragmentary vertical sectional view of the supported drive shaft assembly of FIG. 1; and FIG. 3 is an enlarged, fragmentary vertical sectional view of the drive shaft assembly of FIG. 2.

BEST MODE FOR CARRYING OUT THE INVENTION

Referring to FIG. 1, a scraper tractor 10, exemplary of a vehicle capable of embodying the present invention, is illustrated. A frame 12 carries an engine 14 mounted therein. A drive shaft assembly, generally designated 20, including a drive shaft 22 connects the engine 14 with a transfer gear box 24 which transfers power generated by the engine 14 through a transmission (not shown) in a transmission housing 26 to a final drive assembly 28 which drives ground engaging means 30.

The drive shaft assembly 20 is supported at one end 31 by a flywheel housing 32 and extends therefrom through an upstanding wall 34 of the transmission housing 26, and is supported at the opposite end 35 of the drive shaft 22 by the transfer gear box 24. The shaft assembly 20 extends through an upstanding interior wall 36 disposed within the transmission housing 26 intermediate the wall 34 and the transfer gear box 24.

Referring now to FIG. 2, the drive shaft assembly 20 is described in detail. An engine main shaft 40 mounts a flywheel 44 which includes an internally splined surface 46.

A hub 50 is splined with the surface 46 for rotation with the flywheel 44 and includes a central sleeve 52 with a splined central bore 54 which receives and supports a splined end 56 of the drive shaft 22. The opposite end 35 of the drive shaft 22 is splined and is received and supported in a splined sleeve 62 which is, in turn, received by and coupled for rotation to a gear 64 supported within the transfer gear box 24 as by axially spaced annular bearings 66 and 68. The gear 64 engages and drives the gear train (not shown) of the transfer gear box 24.

The flywheel housing 32 includes a removable cover 70 which includes a central bore 72. Three axially spaced annular bearings 73, 74 and 75 retained within the bore 72 support the hub sleeve 52. One end 76 of a first housing tube 78 extends into the bore 72 and abuts the annular bearing 73.

The tube 78 is coaxial with the drive shaft 22 and with a second housing tube 84 having the same outer diameter as the tube 78. An end 85 of the tube 84 is axially spaced from an end 86 of the tube 78, and the opposite end 87 of the tube 84 is received and supported by an annular seal 88 in an aperture 89 in the wall 34. Overlying the tubes 78 and 84 is a conventional hose clamp and tube assembly 90 which retains and seals the tubes 78 and 84 in coaxial relation with each other and with the shaft 22. A third tube 92 coaxial with the shaft 22 is spaced axially from the tube end 87 and extends between the walls 34 and 36 and terminates within a central aperture 94 of the wall 36. A quantity of suitable lubricant is retained within the tubes 78, 84 and 92.

A drive shaft support bearing assembly, generally designated 95, is supported within the aperture 94 and surrounds the shaft 22, as best seen in FIG. 3. The wall 36 includes an axially extending cylindrical wall 100 which defines the aperture 94, and terminates in a radial face 102 to which a spacer ring 104 is secured, as by bolts 106. The ring 104 includes a radial extension 108 which supports the tube 92 in coaxial relation with the drive shaft 22.

A cylindrical spacer 110 is received by the inner periphery 112 of the tube 92 and projects axially and radially outwardly therefrom for abutment with the inner periphery 114 of the aperture 94. An annular seal 116 is captured by the spacer 110 to prevent the loss of lubricant from within the drive shaft assembly 20. The spacer 110 is adhesively or otherwise bonded to the tube inner periphery 112 to prevent relative rotation therebetween and leakage of lubricant.

An annular bearing 120 comprising an axially extending annular wall 122 and an outwardly extending radial lip 124 is press fitted to the spacer 110. The radial lip 124 is captured between the spacer 110 and a radial wall 126 of the wall 36. The bearing 120 is substantially concentric with the drive shaft 22 and has an inner cylindrical wall 130 spaced from an outer cylindrical surface 132 of the drive shaft 22.

In a typical scraper, the drive shaft 22 will rotate at speeds ranging from 0 rpm at startup to between 2000 and 3000 rpm at normal operation, resulting in high instantaneous linear velocities at points on the shaft's outer surface 132, depending upon the diameter of the shaft 22 as well as on the engine speed. At low speeds, the shaft's rotational axis corresponds to its center of gravity 140.

The rotating shaft 22 tends, as its rotational speed is increased, to deviate from its rotational axis 140. When the shaft's deviation from the axis 140 equals the distance 142 between the bearing surface 130 and the shaft surface 132, rubbing contact of the shaft 22 with the bearing 120 occurs, resulting in the application of pressure and shear stresses against the surface 130.

The bearing 120 of FIGS. 1-3 is illustrated as being mounted generally centrally of the shaft 22, but it is to be understood that the bearing 120 may be positioned at almost any point along the length of the shaft 22. The maximum magnitude of the spacing 142 allowable to effect engagement of the shaft surface 132 with the bearing surface 130 before the shaft's first order critical speed is reached decreases as the linear distance of the bearing 120 from either shaft end 35 or 56 decreases.

The magnitude of the applied stress and pressure is a function of the rotational velocity of the shaft, the shaft diameter and the mass of the shaft which is, in turn, dependent upon the material of construction and other structural features of the shaft 22. Further, friction generated by rubbing contact of the shaft 22 and the surface 130 results in a temperature rise of the bearing and surrounding lubricant.

The material of construction of the bearing 120 must, therefore, be selected to withstand the maximum pressure, velocity and temperature effects generated by contact with the rotating shaft 22 at its maximum speed. It has been found useful to characterize bearing materials in terms of a "PV Rating" in which PV is the product of a shaft's linear rotational velocity V at a point on its outer surface (ft/sec) and the pressure P (psi) applied by the shaft against the bearing at that point at a given point in time. The PV rating (expressed in psi-ft/sec) of a material is the maximum PV value sustainable by the material without destruction or degradation thereof.

In addition to a PV rating, bearing materials are characterized by a temperature rating and a coefficient of friction, the latter of which is ideally low to result in minimal resistance to the rubbing contact between the shfat and the bearing. Further, the bearing material must be sufficiently hard to avoid compression during contact with the shaft, which would result in increased resistance to rotation.

Teflon has been found to have a PV rating of between 10,000 and 15,000 psi-ft/sec and a Shore D hardness of between 50 and 65. Even though Teflon has a desirably low coefficient of friction, the hardness rating, PV rating and temperature durability of Teflon are too low for some applications, but may be suitable for use with relatively small shafts and low speeds. Bearings of bronze or a bronze-aluminum alloy are suitaable for applications involving intermediate levels of stress.

A DuPont polyimide with 15% graphite fill marketed under the trade name "Vespel SP-21" has been found to be suitable for use in bearings as described above over a wide range of shaft and engine characteristics. Vespel SP-21 has a PV factor of 500,000 psi-ft/sec, a coefficient of friction of about 0.2 and a Rockwell M hardness of 88. Vespel SP-21 is capable of withstanding temperatures of up to 500° F. for extended periods of time.

It will be apparent to those skilled in the art that a suitable material must be selected for use with a particular shaft and each application thereof, since various shafts and engine applications result in varying degrees of applied stress.

INDUSTRIAL APPLICABILITY

The inner diameter of the bearing 120 of FIG. 3 is chosen such that the spacing 142 between the shaft 22 and the bearing 120 is traversed by the shaft 22 at a speed lower than the shaft's first order critical speed. Upon engagement with the surface 130, the shaft surface 132 orbits thereabout thereby effecting a change in the shaft's vibration characteristics. It has been found that, due to the changes in vibrational characteristics thus effected, the first order critical speed of the shaft may be raised by a factor of up to 3.

The limiting of the shaft radial deflection effected by the shaft's engagement with the bearing 120 prevents undesirable contact of the shaft 22 with the housing tubes 78, 84 and 92. The elevation of the shaft's first order critical speed by the shaft's intermittent rubbing contact with the bearing 120 places the first order critical speed well above the maximum operating speed of the shaft 22 so that the shaft 22 never experiences excessive oscillation. It will be appreciated that the use of the bearing 120 allows smooth shaft rotation with only periodic rubbing contact, dependent upon speed, with a low friction bearing, resulting in low power losses and minimal frictional wear and temperature effects.

For example, in a test of a steel shaft, similar to the shaft 22 of FIGS. 1-3, 70.88 inches in length and 1.728 inches in diameter operated at 2500 rpm, a PV factor of 500,000 was never exceeded. During operation with a bearing of Vespel SP-21, the lubricating oil attained a temperature of 230° F. with a bearing temperature only slightly higher.

It will be further appreciated that the bearing structure as herein described is low in weight and cost and lends itself to ready field repair and replacement.

Other aspects, objects amd advantages of this invention can be obtained from a study of the drawings, the disclosure and the appended claims.

What is claimed is:

1. In a shaft supporting apparatus (24, 32,36) wherein a shaft (22) having a first order critical speed is supported at both ends (35,56) thereof by spaced support means (24,32) for rotation about an axis (140) corresponding to the centerline (140) of said shaft (22), said ends (35,56) being fixed against radial displacement by said support means (24,32), the improvement comprising:
   a non-yieldable collar (120) fixed about said shaft (22) between the ends thereof and having a cylindrical inner surface (130) facing said shaft (22), and means including said inner surface (130) defining an annular gap between said collar (120) and said shaft (22) of a width less than the radial displacement of said shaft (22) from said rotational axis (140) which occurs at said first order critical speed of said shaft (22).

2. An apparatus (120) for damping oscillation of a shaft (22) having a first order critical speed, the ends (35,56) of said shaft (22) being fixed against radical displacement and rotatably supported by support means (24,32), said shaft (22) having an outer surface (123) at least part of which is cylindrical, said damping apparatus (120) comprising:
   a non-yieldable annular collar (120) fixed about said shaft (22) substantially coaxially therewith between said support means (24,32), said collar (120) defining a cylindrical axially extending surface (130) facing said shaft outer surface (132) part, and means including said cylindrical collar surface (130) and said shaft outer surface (132) part defining an annular gap between said collar (120) and said shaft (22) of a width less than the radial displacement of said shaft (22) from said rotational axis (140) which occurs at said first order critical speed of said shaft (22), said collar surface (130) being of a material having temperature, pressure and velocity resistive properties selected to withstand the pressure, rotational velocity and temperature produced by contact of the collar (120) with said shaft (22) at all operational speeds of said shaft (22).

3. An apparatus (120) for damping oscillation of a shaft (22) with a cylindrical outer surface (132) and having a first order critical speed, said shaft (22) having ends (35,56) fixed against radial displacement and said shaft (22) being rotatably supported at its ends (35,56) by first and second support means (24,32) and third support means (36) intermediate said ends (35,56), said damping apparatus (120) comprising:
   a non-yieldable annular collar (120) fixed to said third support means (36) substantially coaxially with said shaft (22), said collar (120) comprising an axially extending annular wall (122) having an axially extending cylindrical inner surface (130) substantially coaxial with and facing said shaft outer surface (132), and means including said inner surface (130) and said shaft outer surface (132) defining an annular gap between said collar (120) and said (22) of a width less than the radial displacement of said shaft (22) from said rotational axis (140) which occurs at said first critical speed of said shaft (22), said collar (120) further including a lip (124) integral therewith and extending radially outwardly from said wall (122), said third support means (36) including an annular groove (110,114,126) receiving and retaining said lip (124), said collar wall (122) being of a material having temperature, pressure and velocity resistive properties sufficient to withstand the pressure, rotational velocity and temperature produced by contact of said wall (122) with said shaft outer surface (132) at all operational speeds of said shaft (22).

4. In a shaft supporting apparatus (24,32,36) wherein a horizontal shaft (22) having a first order critical speed is supported at both ends (35,56)) thereof by spaced support means (24,32) for rotation about an axis (140) corresponding to the centerline (140) of said shaft (22), said ends (35,56) being fixed against radial displacement by said support means (24,32), the improvement comprising:
   a non-yieldable annular collar (120) fixed about said shaft (22) between the ends thereof and substantially coaxially therewith, said collar (120) having an inner cylindrical surface (130) facing said shaft (22), an means including said inner surface (130) defining an annular gap between said collar (120) and said shaft (22) of a width less than the radial displacement of said shaft (22) from said rotational axis (140) which occurs at said first order critical speed of said shaft (22), said collar surface (130) being of a bearing-like material having a relatively low coefficient of friction and pressure, velocity and temperature resistive properties sufficient to withstand the pressure, rotational velocity and temperature produced by contact of the collar surface (130) with said shaft (22) at all operational speeds of said shaft (22).

5. The collar (120) of claim 4 wherein said collar surface material is a polymeric bearing material.

6. The collar (120) of claim 5 wherein said polymeric bearing material is a polyimide having about 15% graphite fill.

7. The collar (120) of claim 4 wherein said bearing-like material has a PV rating above about 100,000 psi-ft/sec, a Rockwell M Hardness above about 80, a coefficient of friction below about 0.2 and an ability to withstand prolonged exposure to elevated temperatures.

8. The collar (120) of claim 4 wherein said collar surface material comprises bronze.

* * * * *